(12) United States Patent
Piepereit

(10) Patent No.: US 7,237,311 B2
(45) Date of Patent: Jul. 3, 2007

(54) METHOD AND APPARATUS FOR SECURING A CLOSURE IN AN APERTURE OF A CONTAINER

(75) Inventor: Edward John Piepereit, Moreton-in-Marsh (GB)

(73) Assignee: Matcon (R & D) Limited, Moreton-In-Marsh, Glos. (GB)

( * ) Notice: Subject to any disclaimer, the term of this patent is extended or adjusted under 35 U.S.C. 154(b) by 544 days.

(21) Appl. No.: 10/182,641

(22) PCT Filed: Jan. 26, 2001

(86) PCT No.: PCT/GB01/00332

§ 371 (c)(1),
(2), (4) Date: Feb. 19, 2003

(87) PCT Pub. No.: WO01/55018

PCT Pub. Date: Aug. 2, 2001

(65) Prior Publication Data
US 2003/0155359 A1 Aug. 21, 2003

(30) Foreign Application Priority Data
Jan. 27, 2000 (GB) ................................. 0001931.5

(51) Int. Cl.
*B23P 11/02* (2006.01)
*B23P 19/04* (2006.01)
*B25B 27/14* (2006.01)

(52) U.S. Cl. .......................... 29/450; 29/235; 29/281.5
(58) Field of Classification Search ................. 29/235, 29/450, 451, 428, 281.5; 53/405, 97–108, 53/381.4, 281; 141/346, 301
See application file for complete search history.

(56) References Cited

U.S. PATENT DOCUMENTS

| 3,435,996 | A | * | 4/1969 | Jones ....................... 222/386.5 |
| 4,218,967 | A | | 8/1980 | Batchelor |
| 4,972,652 | A | | 11/1990 | Critchley |
| 5,775,544 | A | * | 7/1998 | Semenenko ............... 222/181.1 |

FOREIGN PATENT DOCUMENTS

| EP | 0680902 A1 | 11/1995 |
| EP | 0704384 A2 | 3/1996 |
| EP | 1100733 B1 | 10/2000 |
| WO | 97/05050 | 2/1997 |
| WO | WO98/46505 | * 4/1998 |
| WO | WO 98/46505 | * 8/1998 |
| WO | WO 00/06469 A1 | 2/2000 |

* cited by examiner

*Primary Examiner*—John Hong
(74) *Attorney, Agent, or Firm*—Ostrager Chong Flaherty & Broitman P.C.

(57) ABSTRACT

An apparatus 1 for securing a closure 2 in an aperture 3 of a container 4 comprises a securing cap 5 adapted to engage the closure 2 and the container 4 to secure the closure 2, and fittings to provide for generation and release of a vacuum or partial vacuum between the securing cap 5 and the closure 2 to move the securing cap 5 into a securing position.

16 Claims, 12 Drawing Sheets

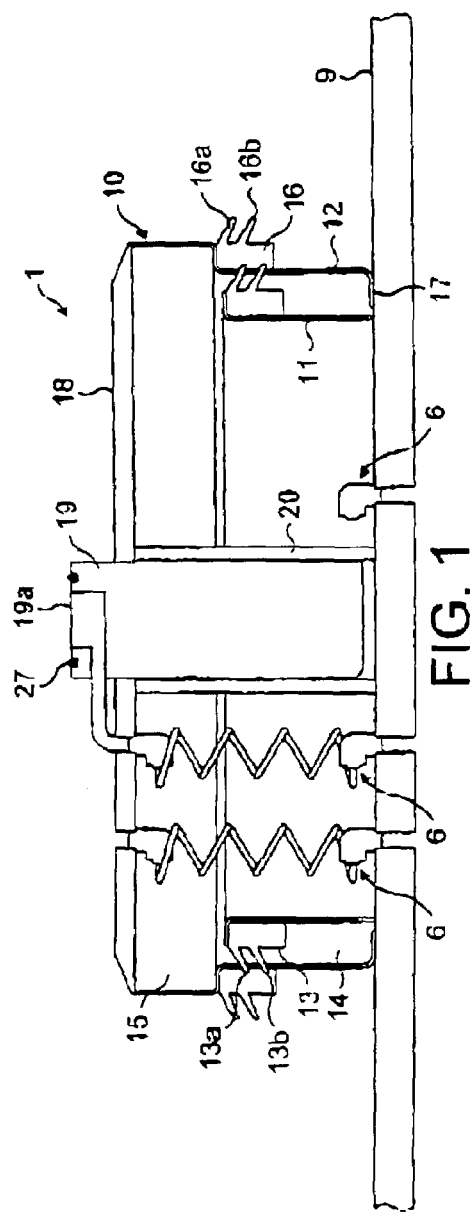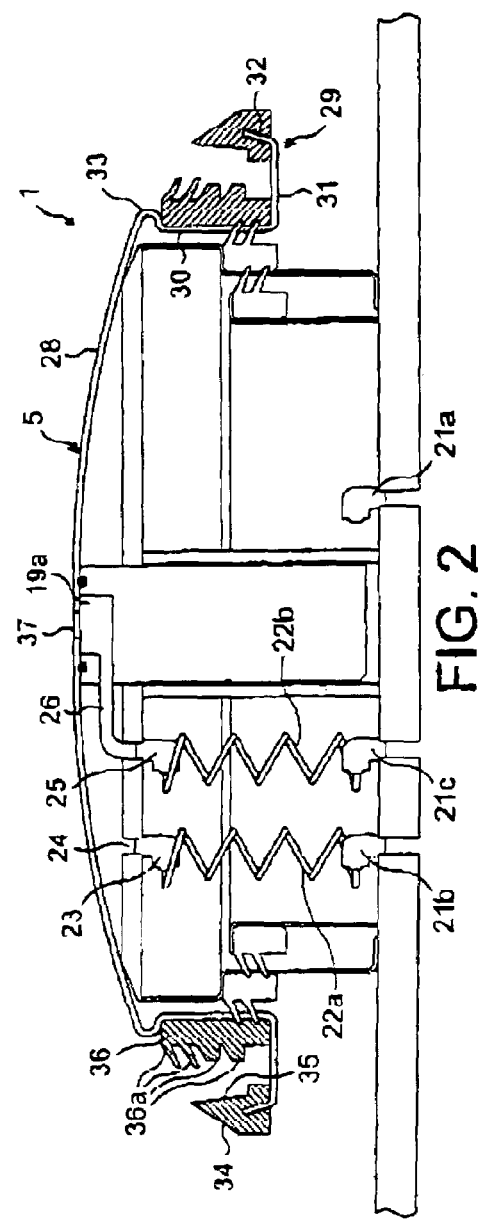

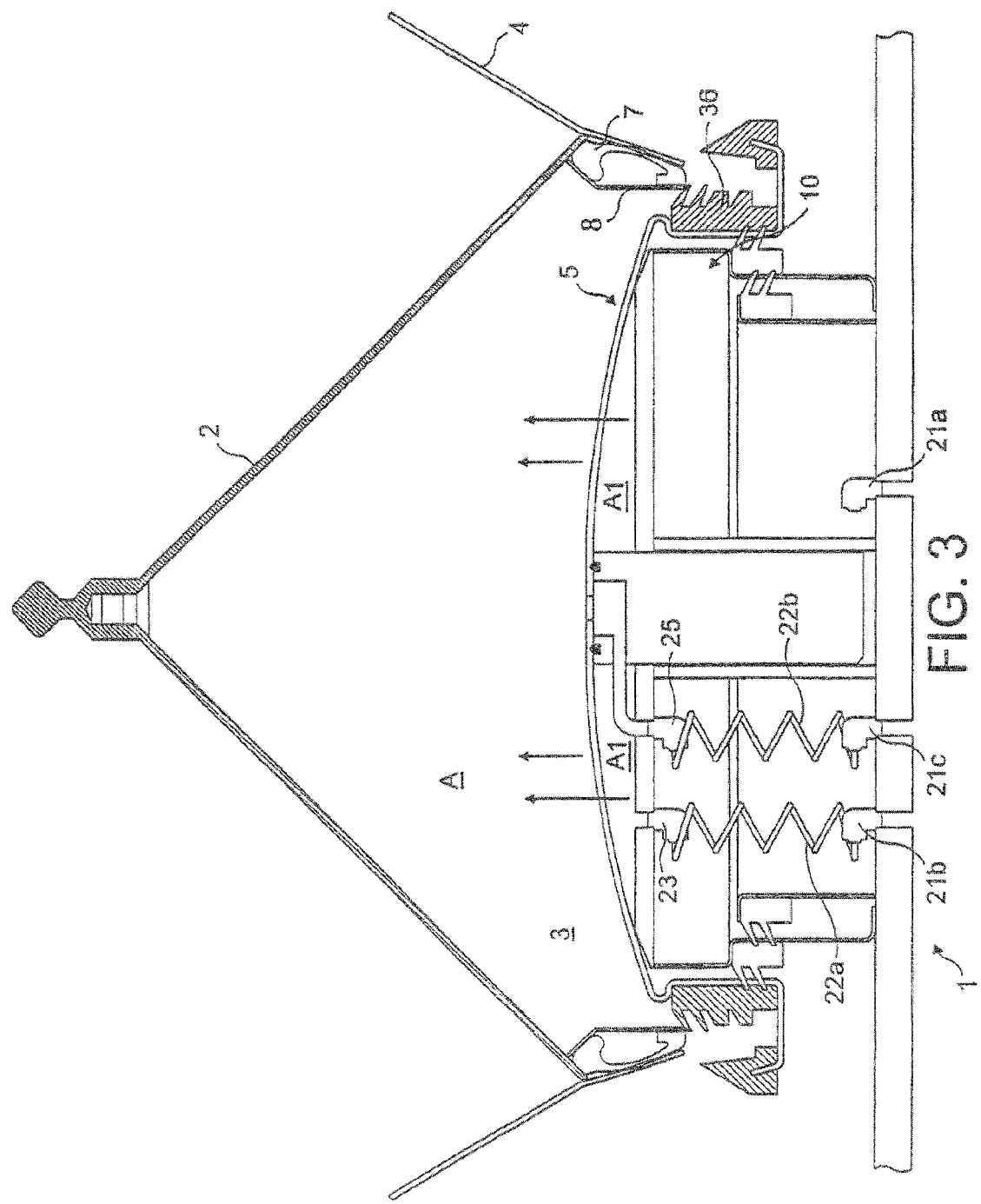

METHOD AND APPARATUS FOR SECURING A CLOSURE IN AN APERTURE OF A CONTAINER

CROSS REFERENCE TO RELATED APPLICATIONS

This application is a 371 of PCT/GB01/00332 filed Jan. 26, 2001.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The invention relates to apparatus for securing a closure in an aperture of a container and to a method of securing a closure in all aperture of a container.

(2) Description of Related Art

Containers for storage and transportation of material often have apertures such as inlets and outlets with removable closures to enable the stored material to be discharged. A problem with such containers is that sometimes the closures can become dislodged or moved inadvertently for example during transport, allowing material to escape. This is a particular problem with containers for the storage and transportation of bulk quantities of materials such as pharmaceutical powders. There are now strict regulations governing the conditions for transportation of for example, hazardous materials, and ensuring that no accidental escape of material occurs is a primary consideration.

To prevent escape of material occurring it has been proposed to provide securing means such as a clamp or cap to secure the closure in place in an aperture and also to cover the aperture. Whilst such apparatus has been found to be effective, there continues to be a need for apparatus and methods which perform a number of functions economically:

i. Provide a dust and weather tight cover over the entire closure and aperture;
ii. Lock the closure securely into the aperture especially to meet U.N. requirements for transportation of hazardous substances;

In addition the effectiveness of the apparatus and methods must not reduce with passage of time.

It is an object of this invention to provide such apparatus and methods.

BRIEF SUMMARY OF THE INVENTION

According to the invention there is provided apparatus for securing a closure in an aperture of a container using means adapted to engage the closure and the container to secure the closure, the apparatus comprising means to provide for generation and release of a vacuum or partial vacuum between the securing means and the closure to move the securing means into a securing position. It has been found that this enables the closure to be secured and released sufficiently firmly and positively to avoid accidental material loss without disturbing the closure in the process of securing and releasing it.

It is preferred that the means to provide for generation and release of a vacuum or partial vacuum comprises airway means. It is further preferred that the airway means is adapted to cooperate with an aperture of the securing means to provide for generation and release of the vacuum or partial vacuum between the securing means and the closure. This is a convenient arrangement which allows the apparatus of the invention to be used with many different forms of securing means.

The apparatus may include second means to provide for generations and release of a vacuum or partial vacuum, the said second means being adapted to provide for generation and release of a vacuum or partial vacuum between the securing means and the apparatus. The said second means preferably comprises airway means.

The apparatus may comprise actuator means adapted to releasably engage the securing means for attachment to the container. This is a convenient arrangement which allows for accurate presentation of the securing means to the container. The actuator may be attached to a base and may be movable relative thereto.

The apparatus may include third means to provide for generation and release of a vacuum or partial vacuum, to move the actuator relative to the base. This is a convenient method of operating the actuator.

The apparatus may include seal means disposed to enable the vacuum or partial vacuum to be generated between the apparatus and the securing means although the seal means may in principle be borne by the securing means.

According to a second aspect of the invention there is provided a method of releasably securing a closure in an aperture of a container using means adapted to engage the closure and the container to secure the closure, the method comprising the use of a vacuum or partial vacuum generated between the securing means and the closure to secure or release the securing means.

The method may include the use of an actuator in moving the securing means to secure or release the closure, and may include the use of a vacuum or partial vacuum to operate the actuator.

The method may also include releasably attaching the securing means to the actuator by use of a vacuum or partial vacuum.

The method may also include the use of seal means of the securing means and/or of the container to assist in maintenance of the vacuum or partial vacuum between the securing means and the container.

BRIEF DESCRIPTION OF THE SEVERAL VIEWS OF THE DRAWINGS

The apparatus and method of the invention will further be described by way of example, and with reference to the accompanying drawings, in which, FIGS. 1 and 2 are schematic illustrations of an embodiment of apparatus according to the invention;

FIGS. 3 to 6 are schematic illustrations of the apparatus of FIGS. 1 and 2 in operation securing a closure in an aperture of a container;

DETAILED DESCRIPTION OF THE INVENTION

Figure 4:
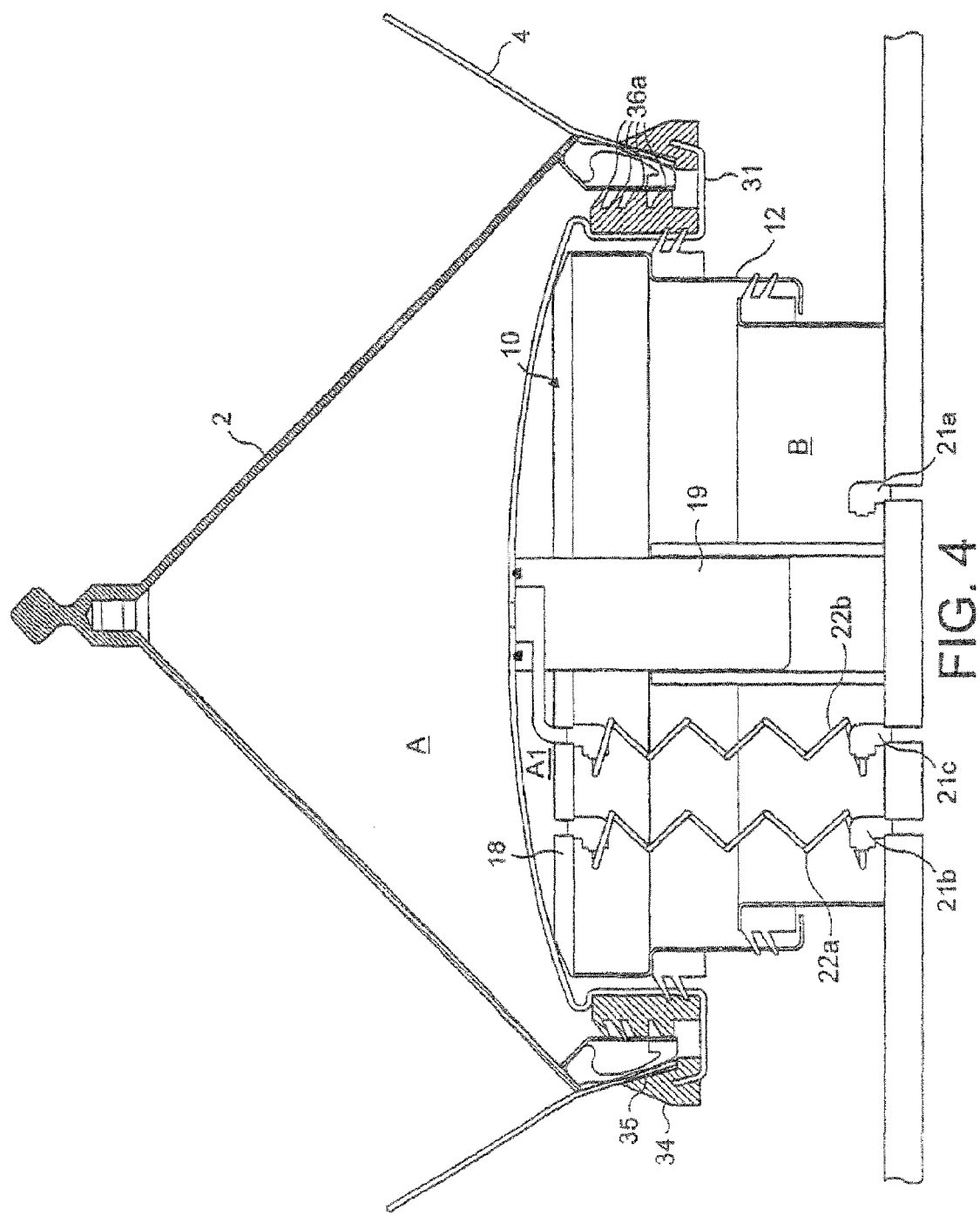

Referring to the drawings there is illustrated apparatus 1 for securing a closure 2 in an aperture 3 of a container 4 using means 5 adapted to engage the closure 2 and the container 4 to secure the closure 2, the apparatus 1 comprising means 6 to provide for generation and release of a vacuum or partial vacuum between the securing means 5 and the closure 2 to move the securing means 5 into a securing position.

In this example the apparatus 1 is designed for fitting securing means 5 to an intermediate bulk container, or I.B.C. 4 to prevent accidental movement of the closure 2. Referring to FIG. 3, the I.B.C. 4 is of conventional design and has an aperture 3 in the form of an outlet for release of material, obturated by a closure 2 which seats in the outlet 3 and seals therein via a cone valve seal ring 7 on a skirt 8. Material is released by raising the closure 2 by suitable apparatus (not shown) as is known in the art.

Referring to FIGS. 1 and 2, the apparatus 1 is mounted on a base plate 9 which can also accommodate the feet of the I.B.C. 4. The apparatus 1 comprises a body having two main parts 11 and 12, one fixed and one movable. The fixed part 11 is a base and the movable part 12 is an actuator 10. In this embodiment the parts take the form of inner and outer concentric cylinders 11, 12, the inner cylinder 11 being fixed to the base plate 9 and the outer cylinder 12 being seated there around and being movable telescopically upwardly relative to the inner cylinder 11. A vacuum-tight resilient seal 13 is disposed on the outside surface at the top (as viewed) edge of the inner cylinder 11, between it and the outer cylinder 12. The seal 13 has two circumferential flanges 13a and 13b which facilitate movement of the outer cylinder whilst retaining a seal between the cylinders 11, 12. The outer cylinder 12 comprises a minor diameter part 14 and a major diameter part 15, with a step in between at which is mounted on the outer surface a second vacuum-tight resilient seal 16, with circumferential flanges 16a, 16b. The outer cylinder 12 has an inwardly directed flange 17 around the lower (as viewed) rim of the minor diameter part 14 and a top plate 18 fixed on top of the major diameter part 15. A guide rod 19 is attached to the plate 18, the guide rod 19 moving in a central cylinder 20 which is itself attached to the base plate 9. The guide rod 19 has an aperture 19a in its upper, as viewed, end and an "O"-ring seal 27 secured around the aperture 19a and standing proud therefrom.

The apparatus 1 has vacuum providing means 6 in the form of pneumatic fittings 21a, 21b, 21c, 23 and 25 and airways 22a, 22b and 26 which are operatively attached to a device to apply suction and generate a vacuum or partial vacuum (not shown). Fitting 21a feeds into the interior of the outer cylinder 12. Fitting 21b feeds into flexible airway 22a which in turn feeds into fitting 23 and then through an aperture 24 in top plate 18. Fitting 21c feeds into flexible airway 22b which in turn feeds into fitting 25 and then into airway 26 which leads into the top of guide rod 19 in central cylinder 20 to aperture 19a.

Referring to FIG. 2, the securing means 5 in this example is in the form of a cap, which consists of a circular, curved plate 28 which has a channel shaped rim 29 and at the centre of the plate 28 an aperture 37. The rim 29 has an inner side wall 30, a base 31 and an outer side wall 32. The inner side wall 30 interfaces with the perimeter of the curved plate 28 creating a continuous nose 33 and a resilient seal ring 36 is fitted between nose 33 and base 31 around the inner side wall 30. The rubber seal ring 36 has four circumferential flanges 36a of varying thickness extending outwardly and downwardly as viewed. The outer side wall 32 has fitted upon it a circular resilient seal 34 which has a sealing surface 35.

Referring to FIGS. 2 to 6, the sequence of operation to secure the closure 2 in position in the outlet 3 is illustrated.

In FIG. 2 the apparatus 1 is shown with securing means 5 in the form of a cap engaged upon the actuator 10 in position ready for attaching the cap 5 to the I.B.C. 4. The cap 5 is conveniently engaged on the actuator manually. The act of placement on the actuator 10 creates a seal between the cap 5 and the apparatus 1 at the vacuum-tight seal 16.

Figure 5:
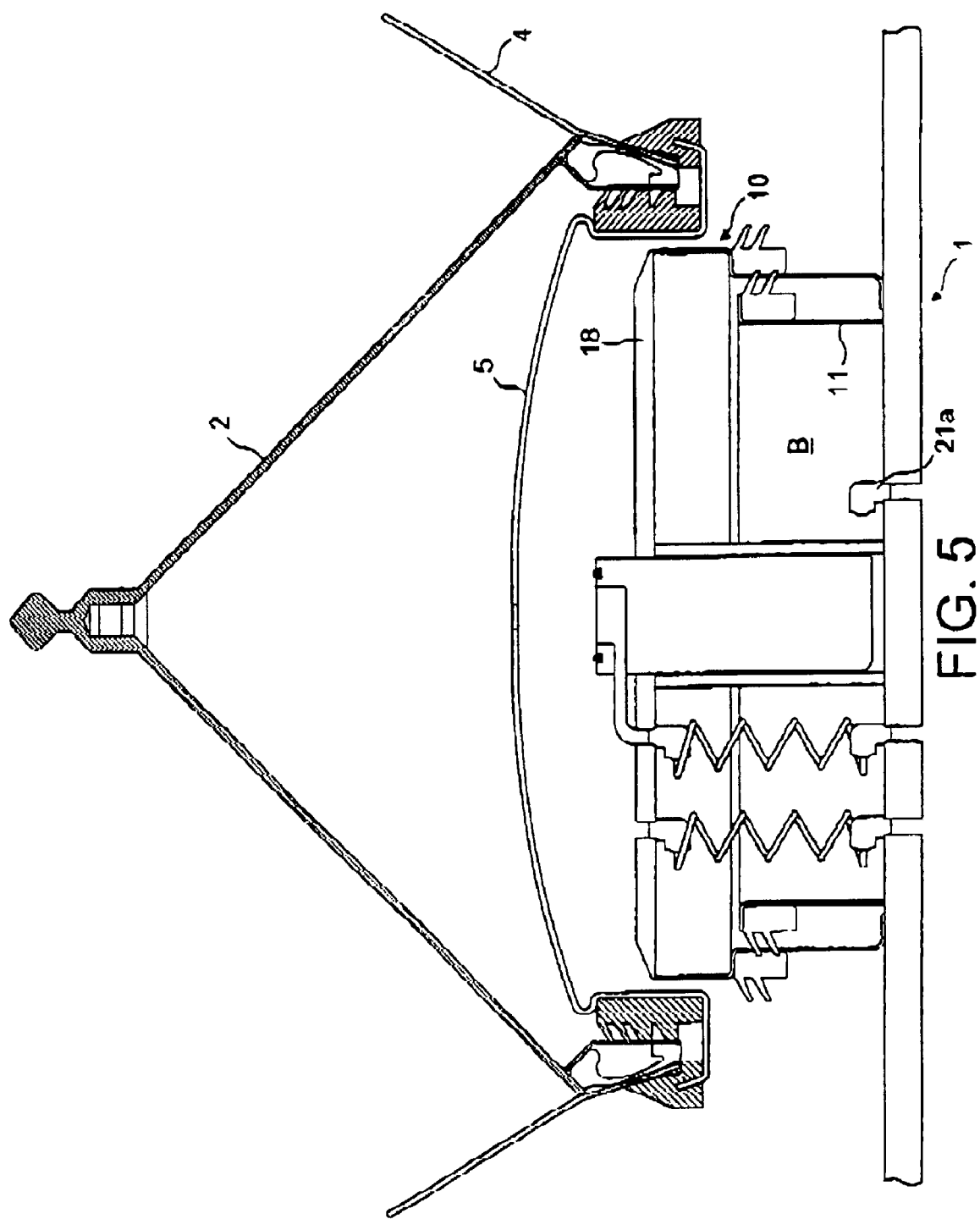
Figure 6:
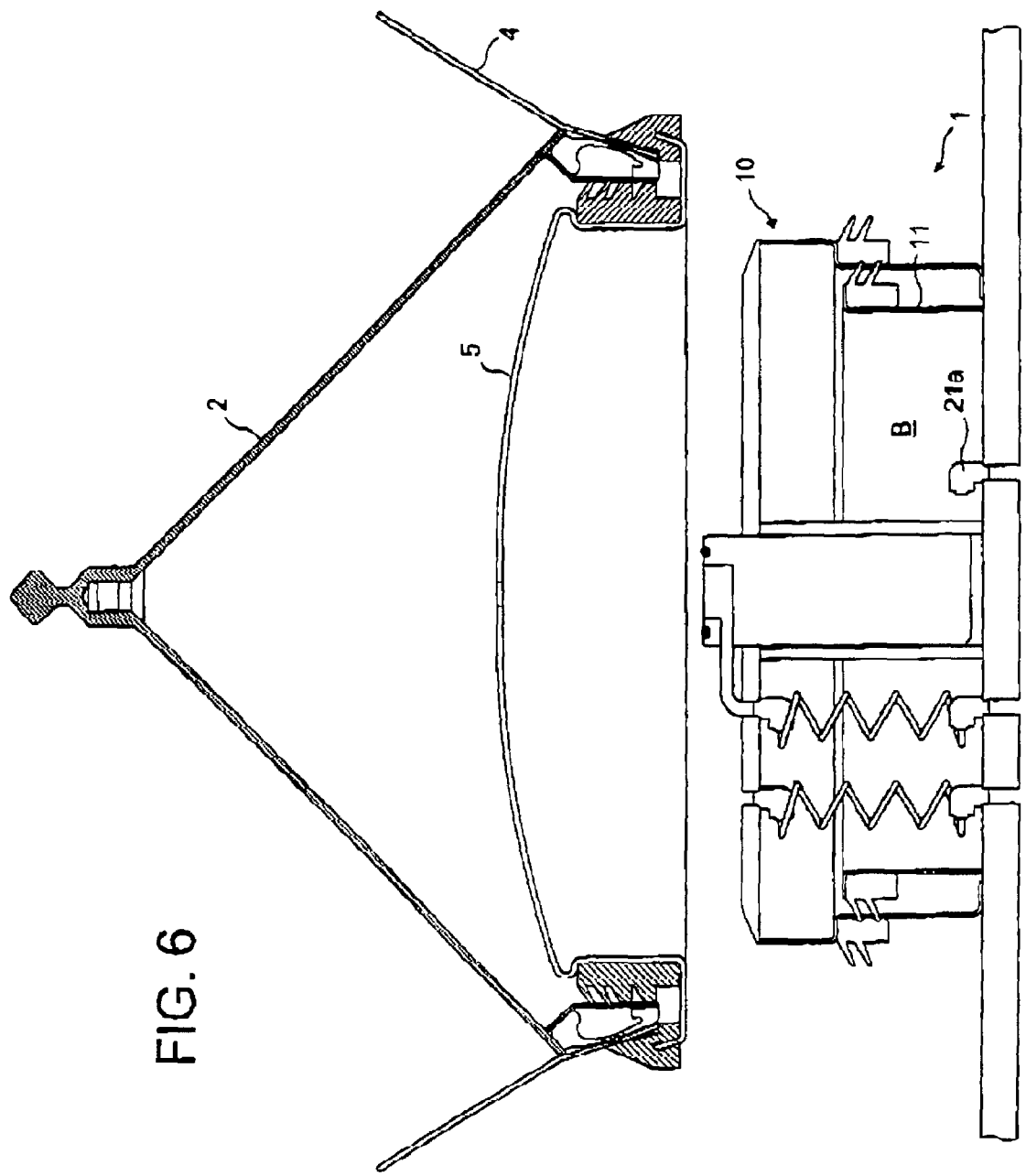

The I.B.C. 4 to be capped is moved by any suitable means such as a crane into position over the apparatus 1 and is lowered. FIG. 3 shows the I.B.C. 4 lowered into place on the apparatus 1. Assisted by positive pressure in the chamber, the skirt 8 of the closure 2 makes contact with the seal ring 36 of the cap 5, creating a vacuum-tight seal. Suction is applied via the pneumatic fittings 21b, 21c, 23 and 25, and airways 22a, 22b and 26 to generate vacuum at "A" and "A1" whilst fitting 21a is vented to atmosphere. The generation of vacuum in the spaces "A" causes the cap 5 still engaged on the actuator 10 to be drawn up into the closure 2 (FIG. 4) extending flexible airways 22a and 22b, the guide rod 19 constraining the apparatus in a vertical, non-tilting movement. It will be appreciated that the vacuum force which needs to be applied will be sufficient to move the weight of the cap 5 and actuator 10 into the closure 2 against resistance from the four circumferential flanges 36a of the seal 36 and from the sealing surface 35 of circular seal 34 and creates a very tight interference fit. It is envisaged however that a sufficiently tight seal between the skirt 8 and the cap 5 could be achieved without the need for a specific seal, for example by use of a resilient material to form the cap 5. When the actuator 10 is fully raised and the cap 5 is fully in position with the lower part of skirt 8 adjacent the base 31 of rim 29, the vacuum at "A" is vented via airways 22a and 22b and fittings 21b and 21c and suction is applied via fitting 21a to generate vacuum in the void space "B" in the actuator 10 beneath the top plate 18. This moves the outer cylinder 12, top plate 18 and guide rod 19 downwardly as viewed, around inner cylinder 11, leaving the cap 5 firmly in place on the I.B.C. 4. When the actuator 10 is fully lowered the I.B.C. 4 secured with cap 5 together are ready to be removed from the apparatus 1 (FIGS. 5 and 6).

Referring to FIGS. 7 to 11, the sequence of operation to release the closure 2 in the aperture 3 is illustrated.

Figure 7:
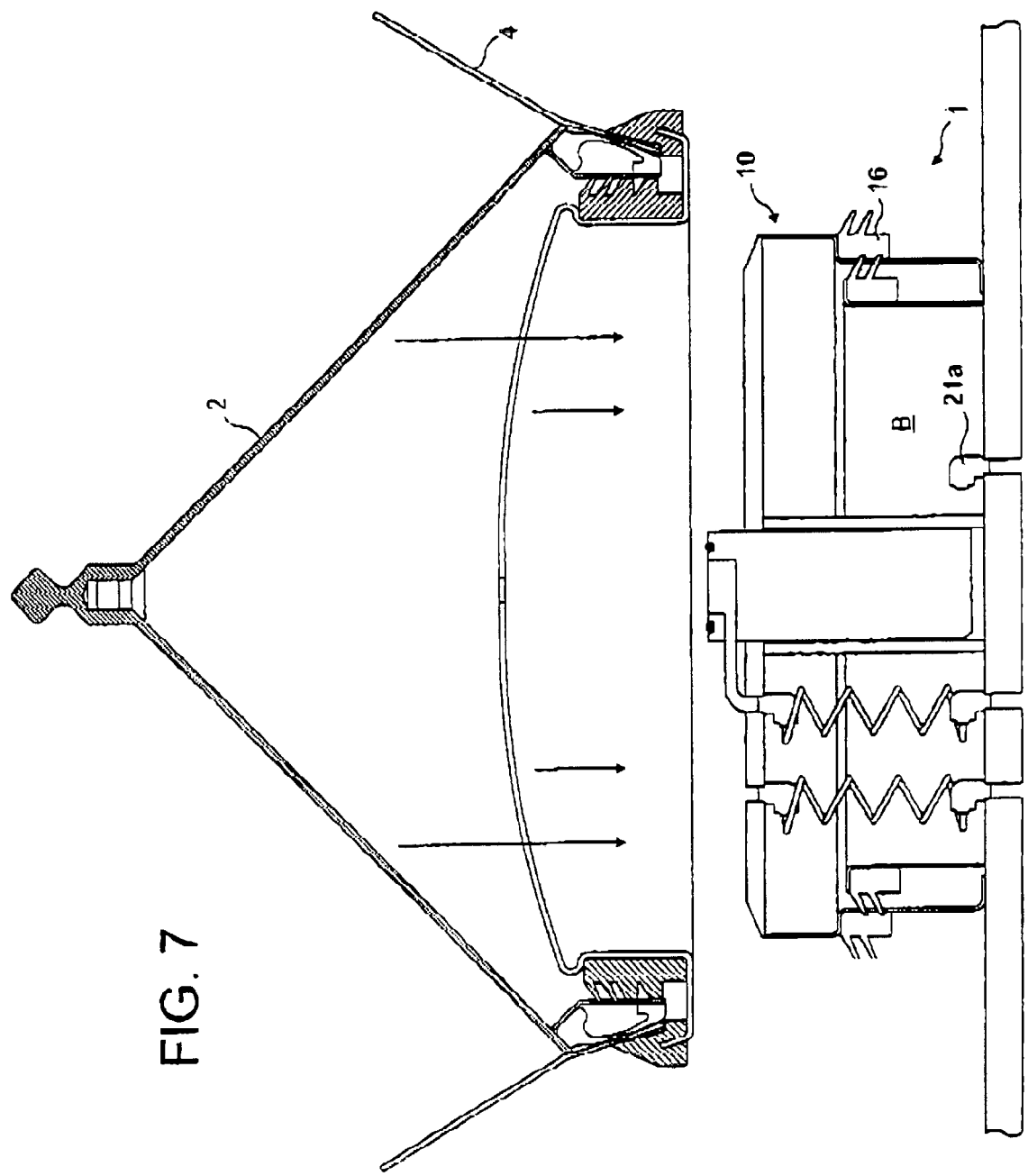
FIGS. 7 to 11 are schematic illustrations of the apparatus of FIGS. 1 and 2 in operation releasing a closure from the aperture of a container.
Figure 8:
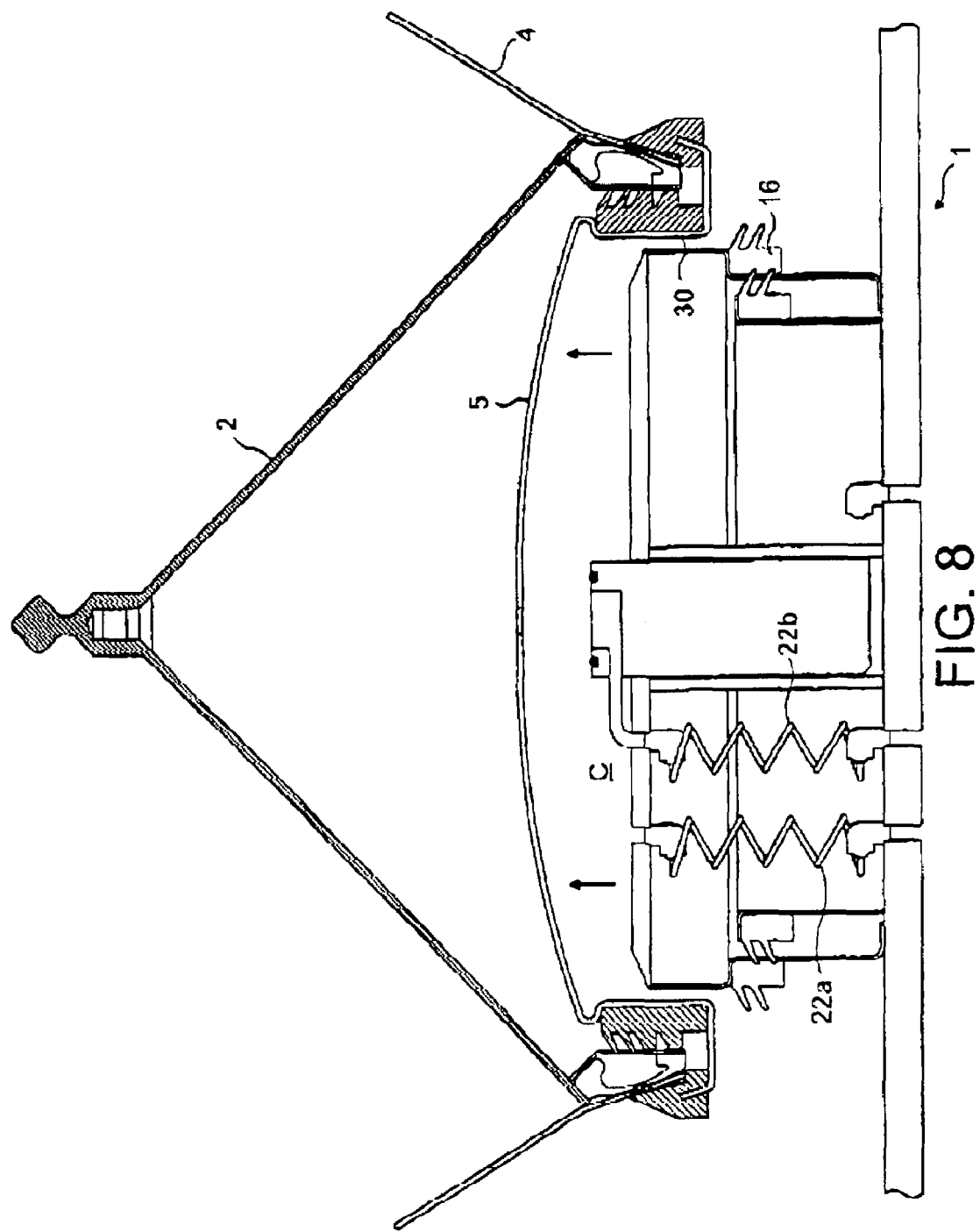

As shown in FIGS. 7 and 8, the I.B.C. 4 is first lowered into place on the apparatus 1. Once in place, air pressure is applied to the void space "B" in the actuator 10 via fitting 21a. This brings the vacuum-tight ring seal 16 into contact with the inner surface of the wall 30. At the same time suction is applied to airways 22a and 22b which generates vacuum at "C" to raise the actuator 10 fully into the cap 5.

Figure 9:
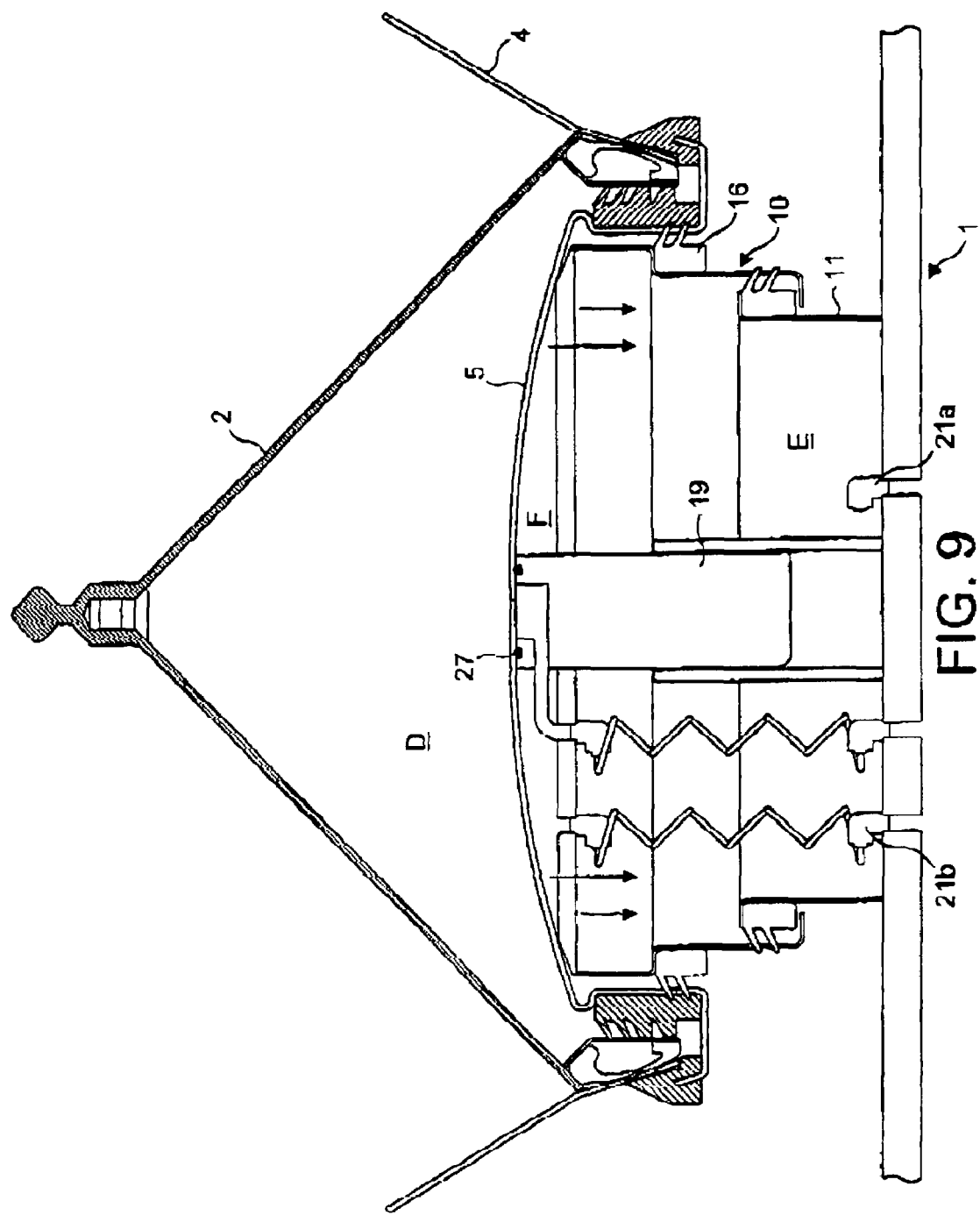

Referring to FIG. 9, when the actuator 10 is fully raised the "0" ring 27 on piston 19 seals against the underside of the cap 5. At this stage the space "D" between the cap 5 and closure 2 can be vented as the vacuum between the cap 5 and the actuator 10 keeps the "0" ring 27 firmly connected. Suction is then applied via fittings 21a and 21b to generate vacuum in the void spaces "E" and "F" which draws the actuator 10 down around the inner cylinder 11, bringing the cap 5 down with it, away from the closure 2.

Figure 10:
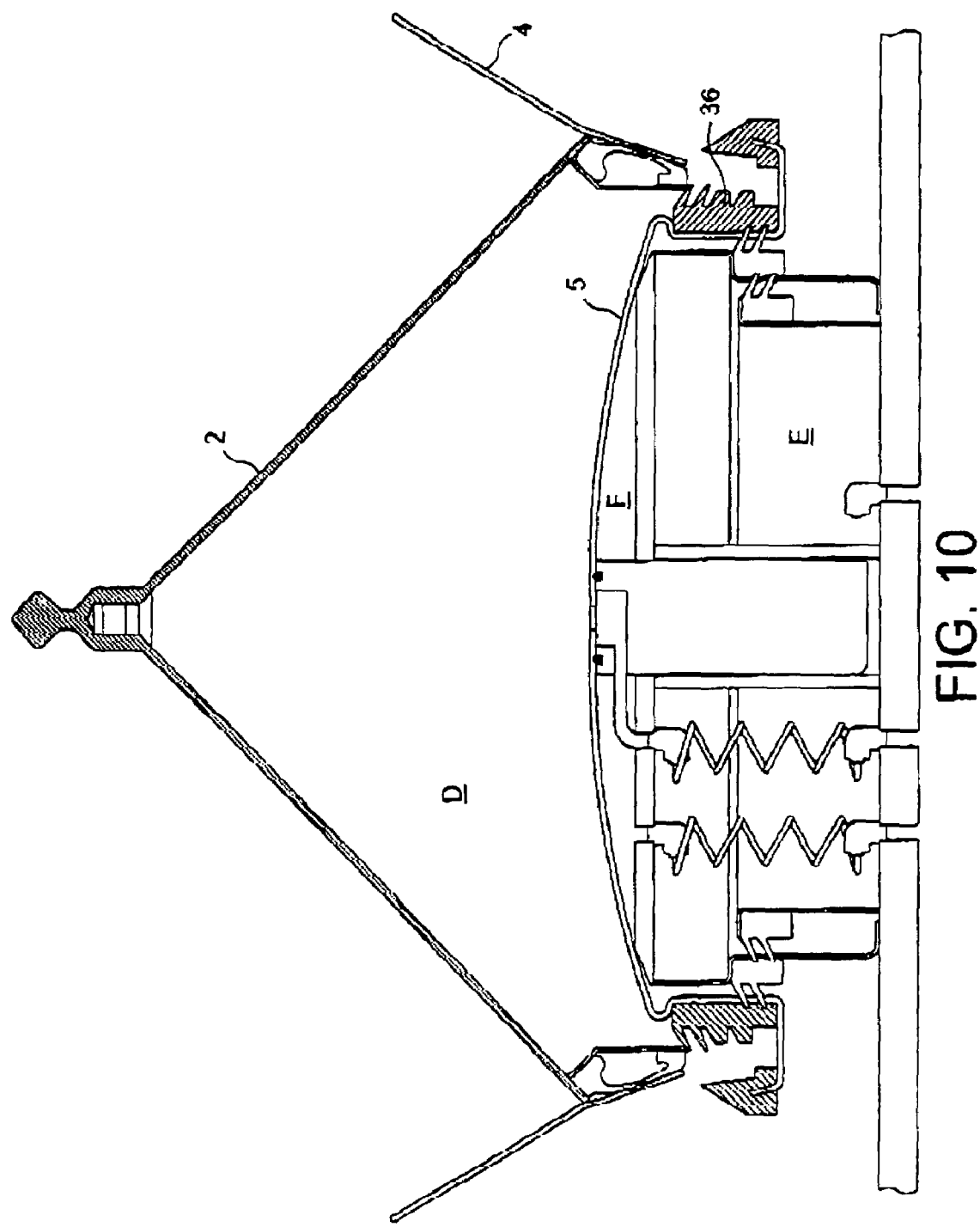
Figure 11:
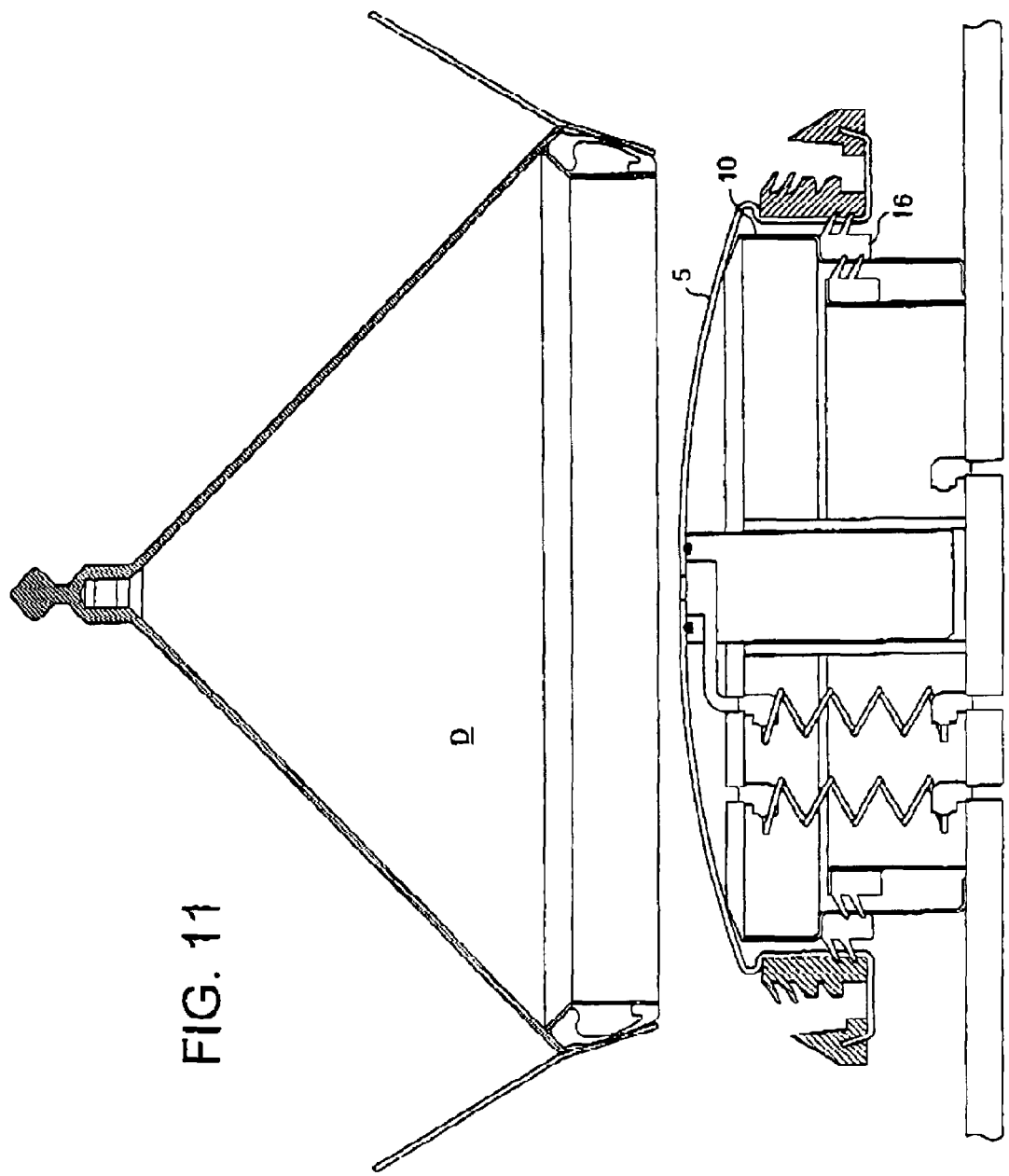

In FIG. 10 the I.B.C. 4 without cap 5 secured is illustrated ready for removal. The very light contact between seal 36 and closure 2, with no vacuum applied, is very easy to overcome as the I.B.C. 4 is lifted away. Finally, in FIG. 11 the vacuum in space "D" having been vented, the cap 5 is allowed to be removed manually from the apparatus 1 because the lip seal 16 is easy to overcome with no suction being applied. Vacuum is retained in void space "E" whilst space "F" is vented to keep the actuator 10 in its located position.

Figure 12:
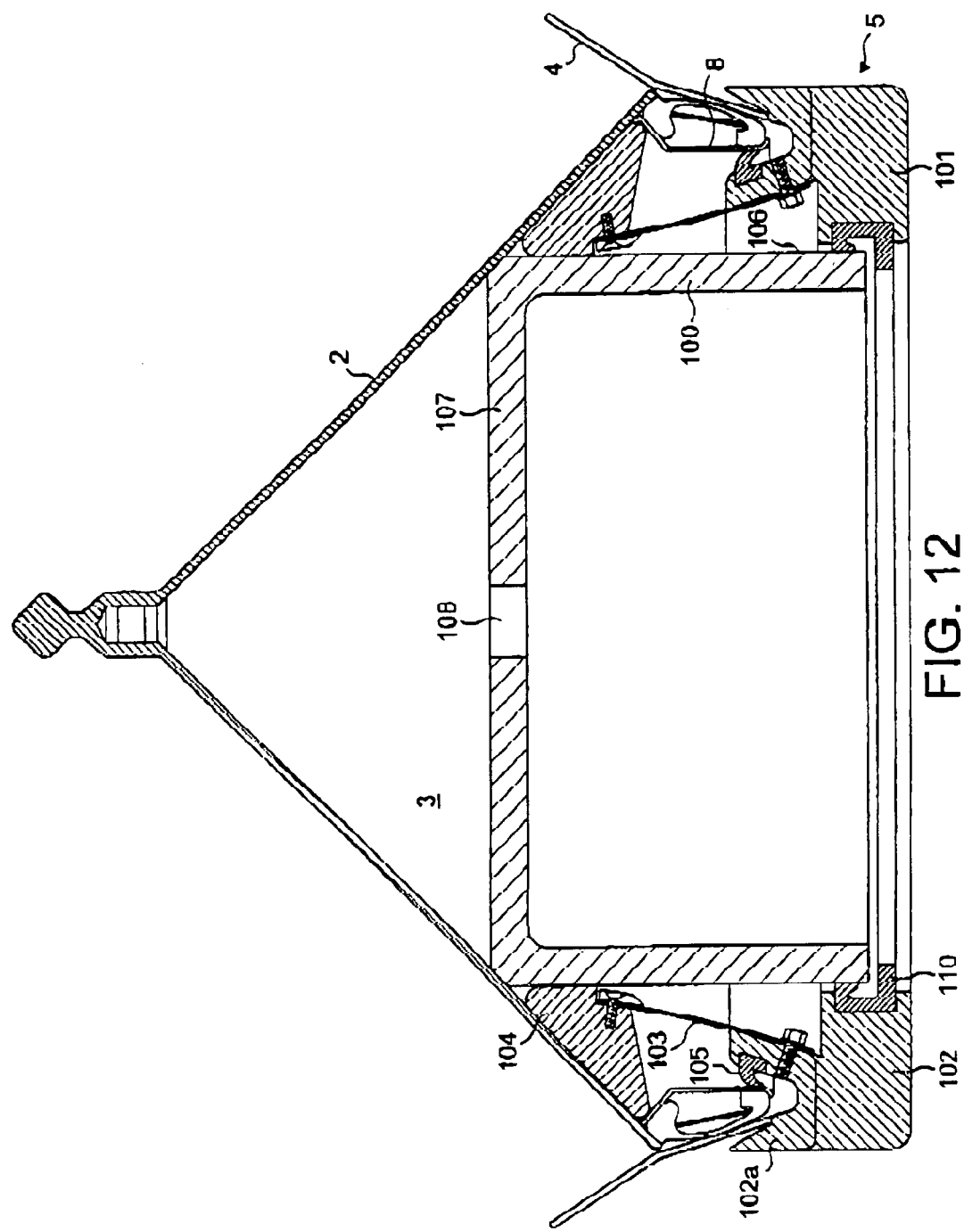
FIG. 12 is a schematic illustration of a second type of securing means for use with the invention.

Referring now to FIG. 12, a further embodiment of securing means 5 is illustrated for use with the apparatus and method of the invention. In this illustration the container 4 is substantially the same as that illustrated in FIGS. 1 to 11, as is the closure 2. However, in this case the securing means 5 comprises two parts, an inner part 100 and an outer part 101 which cooperate to secure the closure 2 in the outlet 3. The outer part 101 comprises a ring 102 which has an upper, as viewed, channel part 102a with two or more resilient leaf springs 103 attached around its inner circumference. Each leaf spring 103 carries a resilient, in this case plastic, nose 104 at its end remote from the ring 102. A seal 105 is disposed about the inner circumference of the ring 102. The inner part 100 takes the form of an up-turned cup, the diameter of the cup being such as to allow it to fit through the ring 102 the wall 106 of the cup sealing with a seal 110 of the outer part 101 as the base 107 of the cup meets the closure 2. An aperture 108 is provided in the base 107.

In use in securing the closure 2 in the outlet 3, the outer part 101 is offered up to the container 4 so that the skirt 8 and outlet 3 are received in the channel part 102a, sealing with a seal 105 of the channel part 102a. The inner part 100 is engaged upon the actuator 10 which seals against the inside of wall 106 and is then moved by means of suction applied through aperture 108 between itself and the closure 2, upwardly into the closure 2, displacing outwardly the leaf springs 103 so that the noses 104 are forced against the closure 2 and skirt 8. Once in place, the vacuum formed between the inner part 100 and the closure 2 can be vented. Thus, operation of this form of securing means 5 to secure and release the closure 2 using the apparatus 1 is substantially as described in the previous embodiment.

Figure 13:
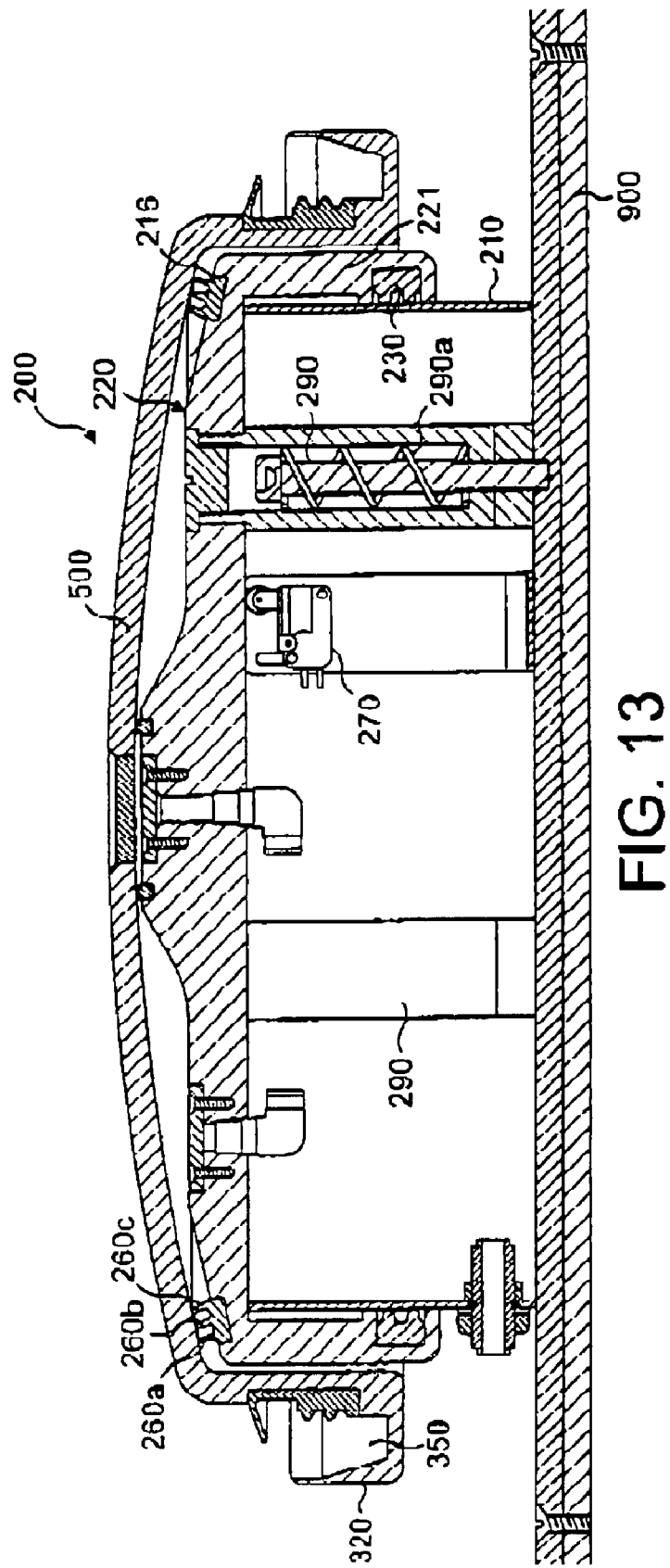
FIG. 13 is a schematic illustration of a further embodiment of apparatus according to the invention.

FIG. 13 illustrates a further alternative embodiment of apparatus 200 for securing a closure in an aperture of a container. The apparatus 200 is of the same general form as illustrated previously herein and is shown in a position corresponding to the position of the apparatus 1 shown in FIG. 2 with securing means in the form of a cap 500 in place thereon. The apparatus 200 comprises means 600 to provide for generation and release of a vacuum or partial vacuum between the securing means and a closure of a container to move the securing means 500 into a securing position. The apparatus is mounted on a base plate 900 and comprises a body having two main parts, 210 and 220, one fixed and one movable. In this embodiment the parts take the form of an inner cylinder 210, with a circular actuator 220 thereon, the actuator comprising an annular flange 221 and being dimensioned to fit over the cylinder 210 to receive it therein. As in other embodiments, cylinder 210 is fixed to the base plate 900. Actuator 220 is movable telescopically upwardly relative to cylinder 210. A vacuum-tight resilient seal 230 is disposed between the cylinder 210 and the actuator 220. The actuator 220 includes on its upper (in use) surface at the perimeter thereof an annular seal 216 which is vacuum-tight, with circumferential flanges 260a, 260b and 260c. In this position the seal 216 makes it particularly easy to remorse the cap 500 from the actuator 220 by hand. In this embodiment it will be noted that there is two central guide rod. Instead, three off guide bars 290 (two are shown) are provided primarily to limit the upstroke. Each has a coil spring 290a which helps to lower the actuator 220. A pneumatic switch 270 is provided to confirm that the actuator is fully lowered before bin removal. The switch could be electrical, electronic or other, and could be fitted to the other embodiments described above. It will be noted that in this embodiment the cap 500 does not have a seal corresponding to seal 34 as previously described, but instead the outer side wall 320 is enlarged and itself provided with a sealing surface 350.

As will be appreciated, this embodiment is operated in the same way as previously described and as such this will not be repeated.

As will be appreciated, the invention is applicable to container inlets and lids as well as outlets and closures. In this example rubber seals are utilised, however, inflatable or other types of seals might be used.

The invention claimed is:

1. Apparatus for securing a closure in an aperture of a container using securing means for securing the closure adapted to engage the closure and the container, the apparatus comprising means for generation and release of a vacuum or partial vacuum in a first volume defined by the securing means and the closure, to move the securing means into a securing position in which the closure is engaged with the securing means and the container is engaged between the closure and the securing means, and further comprising second means for generation and release of a vacuum or partial vacuum in a second volume defined by a void space enclosed within the apparatus.

2. Apparatus according to claim 1, wherein the means for generation and release of a vacuum or partial vacuum comprises an airway.

3. Apparatus according to claim 2, wherein the airway is adapted to cooperate with an aperture of the securing means to provide for generation and release of the vacuum or partial vacuum in a first volume defined by the securing means and the closure.

4. Apparatus according to claim 1, wherein the second means comprises an airway.

5. Apparatus according to claim 1, further comprising seal means for enabling the vacuum or partial vacuum to be generated in the second volume.

6. Apparatus according to claim 1, comprising an actuator adapted to releasably engage the securing means for attachment to the container.

7. Apparatus according to claim 6, wherein the actuator is attached to a base and movable relative thereto, and comprises a guide rod to substantially constrain the apparatus against tilting.

8. Apparatus according to claim 7, wherein the actuator comprises a void space substantially sealed to atmosphere.

9. Apparatus according to claim 7, further comprising third means for generation and release of a vacuum or partial vacuum, to move the actuator relative to the base.

10. A kit of parts for securing a closure in an aperture of a container, comprising securing means for securing the closure adapted to engage the closure and the container, and means for generation and release of a vacuum or partial vacuum in a first volume defined by the securing means and the closure, to move the securing means into a securing position in which the closure is engaged with the securing means and the container is engaged between the closure and the securing means, and further comprising second means for generation and release of a vacuum or partial vacuum in a second volume defined by a void space enclosed within the apparatus.

11. A kit of parts according to claim 10, further comprising a suction device.

12. A method of releasably securing a closure in an aperture of a container using securing means for securing the closure adapted to engage the closure and the container, the method comprising the steps of generating a vacuum or partial vacuum in a first volume defined by the securing means and the closure to move the securing means into a securing position in which the closure is engaged with the securing means and the container is engaged between the closure and the securing means, and generating a vacuum or partial vacuum in a second volume defined by a void space enclosed within the apparatus.

13. A method according to claim 12, further comprising using an actuator to move the securing means towards and away from the container.

14. A method according to claim 13, further comprising using a vacuum or partial vacuum to operate the actuator.

15. A method according to claim 13, further comprising releasably attaching the securing means to the actuator by use of a vacuum or partial vacuum.

16. A method according to claim 12, further comprising using a seal of the securing means and/or of the container to assist in generation of the vacuum or partial vacuum between the securing means and the container.

* * * * *